3,194,632
PROCESS FOR THE MANUFACTURE OF MAGNESIUM PHOSPHATES OR OF SALT MIXTURES CONTAINING MAGNESIUM PHOSPHATES
Avraham M. Baniel, Haifa, Simon Lavie, Ramat Shaul, Haifa, and Hugo C. Heimann, Kiryath Bialik, Haifa, Israel, assignors, by mesne assignments, to Israel Mining Industries-Institute for Research and Development, a company of Israel
No Drawing. Filed Aug. 13, 1962, Ser. No. 216,330
Claims priority, application Israel, Aug. 20, 1961, 15,921
12 Claims. (Cl. 23—105)

The present invention concerns the manufacture of anhydrous magnesium phosphates from tertiary calcium phosphate, especially rock phosphate. The invention is in particular concerned with the manufacture of tertiary magnesium orthophosphate, $Mg_3(PO_4)_2$, by the complete replacement of the calcium by magnesium in the molecule of the tertiary calcium phosphate. However, the invention also extends to the case of partial replacement of calcium by magnesium, whereby mixed tertiary magnesium-calcium orthophosphates are produced. All these phosphates will be referred to herein as "magnesium phosphate" for short except where the tertiary magnesium phosphate $Mg_3(PO_4)_2$ is expressly to be distinguished from the mixed magnesium-calcium phosphates.

Magnesium phosphate, and especially tertiary magnesium orthophosphate, could be used as a valuable fertilizer because of its high $P_2O_5$ content, if it were possible to prepare it industrially at reasonable costs. This, however, could so far not be achieved.

The chemically most obvious way of preparing magnesium phosphate is by way of reaction of a water-soluble phosphate with a magnesium salt, or of phosphoric acid with magnesium oxide or hydroxide. Such processes are easy to carry out but the water-soluble phosphates and phosphoric acid are expensive starting materials. It has, therefore, been suggested to produce magnesium phosphate by the reaction of magnesium chloride with rock phosphate, and particularly to react hydrated magnesium chloride (bischofite) at elevated temperature with rock phosphate. This process has the drawback that the hydrated magnesium chloride decomposes in the heat into magnesium oxide and hydrochloric acid and the latter mostly escapes without reacting with the calcium phosphate. It has, therefore, been proposed to carry out the reaction in a stream of HCl at 1000° C. This is a difficult procedure to carry out industrially for several reasons, among others because it requires high temperatures and the use of expensive corrosion resistant equipment. An attempt to react hydroxyapatite (the calcium phosphate component of some kinds of rock phosphate) with anhydrous magnesium chloride has also been reported but the report shows that this attempt has been unsuccessful.

There exist commercially available fertilizers which may be regarded as containing magnesium phosphate. These fertilizers, generally called "thermo-phosphates" or by some similar name, are obtained by the reaction of clay phosphates (Tonerde-Phosphate) with a magnesium salt, e.g. the sulfate or chloride, at high temperature, of the order of 850 to 1000° C. Typical compositions obtained in this way have a $P_2O_5$ content of 15–25%, i.e. much lower than the $P_2O_5$ content of pure magnesium phosphate. Moreover, the large proportion of calcium, iron and alumina contained in these products constitutes an unnecessary ballast. Further, the high temperature required for the manufacture of these fertilizers makes them rather expensive.

In accordance with the invention, rock phosphate is reacted with an at least partly fused mixture of anhydrous magnesium chloride and an alkali metal chloride or ammonium chloride containing substantially the amount of magnesium stoichiometrically equivalent to the amount of calcium of the rock phosphate to be replaced by magnesium, and, if desired, the reaction product is leached with water for the removal of part or all of the chlorides contained in the reaction product.

In this reaction there occurs a stoichiometric replacement of calcium by magnesium.

If the intended product is tertiary magnesium orthophosphate, the amount of magnesium introduced into the reaction mixture will be stoichiometrically equivalent to, or preferably in excess of, the total amount of calcium contained in the rock phosphate. Any amount of magnesium chloride used in excess over the amount required for the complete replacement of calcium by magnesium is found in the product substantially as free MgO.

If less than the stoichiometrically required amount of magnesium is used a mixture of calcium and magnesium phosphates is produced but the original apatite structure is thoroughly modified even by such partial replacement of calcium by magnesium, as evidenced by the easy availability of the $P_2O_5$ of the product to plants. Such mixed Ca-Mg phosphates are of particular interest for use in soils lacking Ca but rich in Mg.

The reaction mixture may be a melt in which all or most of the component chlorides have actually become liquid, or a sintered mass in which most of the salt crystals have not yet fully lost their identity. Experiments will determine for each particular composition of starting materials whether the sintered or the fully liquefied state is preferred.

Rock phosphate contains as a rule some calcium carbonate and calcium fluoride which, by reaction with magnesium chloride, is transformed into magnesium carbonate and magnesium fluoride and a corresponding amount of calcium chloride. According to the desired degree of purity of the magnesium phosphate to be produced, the magnesium carbonate, and also any magnesium oxide forming in the process, may be left associated with the magnesium phosphate, or it may be separated from the phosphate in a known manner. In any case, in the calculation of the amount of magnesium chloride necessary for the process, allowance has to be made for the calcium carbonate and fluoride contained in the rock phosphate so that the total amount of magnesium chloride is stoichiometrically sufficient for the conversion of all the calcium present in the ore into the corresponding magnesium compounds.

The reaction mixture may contain the magnesium chloride and the alkali metal or ammonium chloride either in the form of a double salt of molar ratio 1:1, e.g. as carnallite or the sodium or ammonium analogue of carnallite, or in any other suitable molar ratio.

In contrast to what happens when rock phosphate is reacted in the heat with hydrated magnesium chloride alone, no thermal decomposition but a simple dehydration of the magnesium chloride takes place in the process according to the invention. The reaction between the calcium phosphate and magnesium chloride, by which the desired magnesium phosphate is formed, thus becomes a pure metathetic (ion exchange) process without the participation or presence of significant amounts of hydrochloric acid. This straight and quantitative exchange reaction between tertiary calcium phosphate and magnesium chloride, which could not be achieved by the hitherto known processes, is apparently due to the presence of alkali metal or ammonium chloride which seems to facilitate the dehydration of the magnesium chloride. In particular, the presence of ammonium chloride and potassium chloride counteracts the thermal decomposition of magnesium chloride during the dehydration. The presence of sodium chloride acts in the same direction though less pronouncedly so. Depending upon the composition of the salt mixture used it is often possible to carry out the reaction while the mass is merely sintered without attaining actual fluidity. When sodium chloride replaces ammonium or potassium chloride, this may result in an increase in the MgO content of the reaction product. For many soils, magnesium phosphate containing MgO is an excellent fertilizer. Where the presence of MgO is not desired it can be separated and recovered by known means.

The required reaction temperature is usually within the range of 300–600° C. and depends on the composition of the chloride mixture and the nature of the rock phosphate.

Depending on the nature of the starting materials and the composition of the reaction mixture the products obtained by the process according to the invention vary in their $P_2O_5$ content. A typical product obtained from a rock phosphate containing 30–34% by weight of $P_2O_5$ may contain 34–40% of $P_2O_5$ and 46–53% of MgO.

The reaction according to the invention can be carried out in varoius ways.

According to one procedure the salt mixture, e.g. carnallite, is melted and the phosphate is introduced into the melt.

By another procedure the starting materials are mixed in the solid state and the mixture is dried and heated so that the magnesium chloride and alkali metal or ammonium chloride are melted.

By yet another procedure, a reaction mixture is prepared in the solid state from magnesium chloride hexahydrate, alkali metal chloride and phosphate rock. This reaction mixture is first dehydrated at moderate heat and then introduced into a bath of molten calcium chloride and alkali metal chloride. Magnesium phosphate precipitates from the bath and is separated while another batch of dehydrated reaction mixture can be introduced into the bath.

Or else, a mixture of starting materials in the solid state may be heated so that the magnesium chloride is gradually dehydrated and the mixture begins to sinter and granules form.

If a mixture of magnesium chloride and ammonium chloride or an ammonium chloride-magnesium chloride double salt of the carnallite type is used, the ammonium chloride is evaporated during the reaction. After the calcium chloride has been removed from the reaction product by leaching, the residue is a technical magnesium phosphate of a high $P_2O_5$ and MgO content.

Where, on the other hand, the starting material contains sodium or potassium chloride this passes into the reaction product. From a reaction product containing potassium chloride, the calcium chloride can be washed preferentially and the remaining mixture of magnesium phosphate and potassium chloride is a valuable fertilizer. In this case nearly all the potassium contained in the starting material, e.g. carnallite, is utilized in the fertilizer. If for some reason it is not desired to retain potassium chloride in mixture with magnesium phosphate, it is easy to separate the potassium chloride by methods of flotation or of hot-leach, whichever is cheaper.

In case the starting material contains sodium chloride the latter is removed by leaching from the reaction product together with the calcium chloride.

The technical magnesium phosphate obtained in accordance with the invention is not only a valuable fertilizer by itself but it has also all the major chemical properties of magnesium phosphate. Thus it reacts with ammonium chloride to form an ammonium magnesium phosphate, or with sodium carbonate to form sodium phosphate and in this respect it can replace phosphoric acid.

The invention is illustrated by the following examples without being limited thereto.

*Example 1*

100 g. of de-slimed rock phosphate from Oron (Israel) containing

30% of $P_2O_5$
9% of $CO_2$
50.5% of CaO and
3% of F was admixed with 300 g. of a dehydrated natural technical grade carnallite containing 0.8% of Ca
9.7% of Mg
12.7% of K
10.7% of Na
57.4% of Cl and
4.6% of $H_2O$ In this mixture the amount of magnesium was in excess by about 30% over the amount stoichiometrically equivalent to the total amount of calcium present. The mixture was heated in a tubular reaction vessel to 490–520° C. and maintained at this temperature for one minute. The $MgCl_2$ was thereby dehydrated, then fused. The condensation of evaporated water on the cooler parts of the walls of the tube during the heating-up period was prevented by the application of a vacuum. After cooling, the solid mass was leached with water until free of chloride whereby the entire calcium chloride and potassium chloride was removed, then the magnesium phosphate residue was filtered off and the filter cake washed with water. After drying it had the following composition:

34% of total $P_2O_5$
22% of ammonium-citrate-soluble $P_2O_5$
27.2% of Mg
0.6% of Ca The Mg balance was as follows:

| | G. |
|---|---|
| Introduced in the form of carnallite | 29.1 |
| Mg-equivalent of the dissolved amount of Ca (35.9 g. Ca) | 21.54 |
| Mg in solution | 7.4 |
| Total | 28.94 |

By a modification of this process the cooled solid mass was leached with a smaller amount of water whereby calcium chloride in an amount corresponding to 99.5% of the calcium introduced into the reaction and 7.3 g. of magnesium corresponding to the amount of magnesium chloride introduced in excess over the amount required for the formation of magnesium phosphate were removed from the solid mass while virtually all the potassium chloride remained in the mass.

*Example 2*

100 g. of chemically pure tricalcium phosphate was admixed with 400 g. of the same carnallite as used in Example 1. The mixture fused at 470–510° C. and was kept within this temperature range for one minute. The condensation of evaporated water was prevented by the application of a vacuum to the reaction vessel.

The working-up procedure was the same as in the preceding example. The aqueous extract contained 82.8% of the calcium introduced and also 17.15 g. of Mg. which corresponded to the amount of $MgCl_2$ introduced in excess over the amount required for the production of magnesium phosphate.

The Mg balance was as follows:

| | G. |
|---|---|
| Introduced in the form of carnallite | 38.8 |
| Mg-equivalent of the dissolved amount of Ca (36 g. Ca) | 21.6 |
| Mg in solution | 17.15 |
| Total | 38.75 |

Example 3

300 g. of the ammonium chloride-magnesium chloride double salt $NH_4Cl \cdot MgCl_2 \cdot 6H_2O$ was introduced into a reaction tube and the tube was gradually heated whereby the salt was dehydrated. The condensation of the evaporated water on the colder parts of the tube was prevented by the application of a vacuum. Some of the $NH_4Cl$ contained in the starting material sublimed at this stage and was collected.

When the temperature reached 410° C., 100 g. of the same de-slimed Oron rock phosphate as used in Example 1 was introduced into the tube and the mixture was then heated to 600° C. while being agitated. During this stage of the operation the remaining $NH_4Cl$ sublimed while the magnesium chloride reacted with the rock phosphate. The reaction mass was then allowed to cool and thereafter leached with water and the solid cake washed until free of chloride. The aqueous extract and washing water contained 90% of the calcium.

The dry product was similar in composition to that of Example 1.

Example 4

A mixture of $MgCl_2 \cdot 6H_2O$ and KCl containing 9.2% of Mg
39.1% of Cl
11% of K
40.0% of $H_2O$ was dehydrated and then ground. The product contained 0.92% of $H_2O$.

180 g. of the dehydrated salt mixture was heated to 540° C. at which temperature it fused. The reaction vessel was connected to a vacuum pump during the heating-up period in order to prevent the condensation of the evaporated residual water. 100 g. of ground dry Moroccan rock phosphate containing 32.3% of $P_2O_5$ and 34.8% of CaO was introduced into the melt and after cooling the solid mass was worked up as described in Example 1. The final product contained 34.8% of $P_2O_5$.

Example 5

70 g. of the same de-slimed Oron rock phosphate as used in Example 1 was mixed with 200 g. of natural carnallite containing 0.3% of Ca
8.1% of Mg
12% of K
1.4% of Na
37.2% of Cl and
41% of $H_2O$ (by difference)

the excess of $MgCl_2$ thus being approximately 22%. The mixture was heated up to 520–550° C.; condensation of water evaporated during the heating-up period was prevented by the application of a vacuum. After the solid mass had cooled it was leached with water and washed until free of chloride. The aqueous extract contained 91.5% of the Ca introduced and also an amount of 3.8 g. of Mg corresponding to the amount of $MgCl_2$ introduced in excess.

The Mg balance was as follows:

|  | G. |
|---|---|
| Introduced in the form of carnallite | 17.8 |
| Mg-equivalent of the dissolved amount of Ca (23.3 g. Ca) | 14.0 |
| Mg in solution | 3.8 |
| Total | 17.8 |

Example 6

A mixture of 11.5 kg. of the same natural carnallite as used in Example 5 and 3 kg. of the same de-slimed Oron rock phosphate as used in Example 1 was charged continuously in the course of one hour into a rotary furnace directly heated to 550° C. by combustion gases flowing in countercurrent to the charge. The water present initially in the feed mixture escaped with the flue gases, which contained 14% of $CO_2$ at 300° C. The mixture was completely fused. The discharged reaction product was allowed to cool and then washed and dried. Its composition was the following:

33.5% to total $P_2O_5$
20% of citrate-soluble $P_2O_5$
27% of Mg
2.5% of Ca

Example 7

A mixture of 13.3 kg. of carnallite (containing 8.3% of Mg, 13.3% of K, 6% of Na) and 3.8 kg. of the same Moroccan phosphate as in Example 4 was continuously charged into a rotary furnace heated directly by combustion gases flowing in countercurrent to the charge. The water initially present in the feed mixture was eliminated by the flue gases. The mixture sintered at 460–480° C. and was not heated beyond this temperature range. After being discharged from the furnace the reaction product was allowed to cool, washed with water until free from chloride, and dried. It had the following composition:

34.7% of total $P_2O_5$
17% of citrate-soluble $P_2O_5$
30% of Mg
3.4% of Ca

Example 8

Similarly as described in Example 7 a mixture of 21 kg. of carnallite (containing 7.8% of Mg, 10.4% of K and 8% of Na) and 6 kg. of de-slimed Oron rock phosphate (containing 28% of $P_2O_5$ and 36% of Ca) was completely melted at 450–480° C. After leaching with water similarly as in Example 1, the product had the following composition:

31% of total $P_2O_5$
18.5% of citrate-soluble $P_2O_5$
29.3% of Mg
1.9% of Ca
0.4% of water-soluble Cl As a variant of this example, the reaction product was not leached with water but quenched by being discharged from the furnace directly into a bath of water. The soluble salts contained in the reaction mixture dissolve in the bath, the insoluble magnesium phosphate is separated and dried.

Example 9

A mixture of 13.3 kg. of carnallite (containing 8.3% of Mg, 13.5% of K and 6.9% of Na) and 3.8 kg. of the same Moroccan phosphate as in Example 4 was continuously charged in the course of one hour into a rotary furnace directly heated by combustion gases flowing in countercurrent to the charge to 200–230° C. At this temperature the mixture was dehydrated.

The dehydrated mixture was charged again into the same furnace which was now heated to 520–550° C., whereby the mass was completely melted. The discharged product was allowed to cool, washed with water until free from chloride, and dried. It had the following composition:

34% of total $P_2O_5$
20% of citrate-soluble $P_2O_5$
29.3% of Mg

Example 10

A mixture of 13.3 kg. of carnallite (containing 8.3% of Mg, 13.5% of K and 6.9% of Na) and 3.8 kg. of ground Moroccan phosphate (containing 32.2% of $P_2O_5$ and 34.8% of Ca) was continuously charged in the course of one hour into a rotary furnace directly heated by combustion gases flowing in countercurrent to the charge to 200–230° C. At this temperature the mixture was dehydrated.

The dehydrated mixture was dropped into a bath of molten $CaCl_2$, NaCl and KCl in the ratio in which they the present in the product of the reaction of the carnallite and rock phosphate used as starting materials. The dry mixture discharged from the furnace into the bath of molten salts immediately reacted in the bath. A precipitate of anhydrous trimagnesium phosphate, insoluble in the bath, separated and was recovered, while the $CaCl_2$ formed by the reaciton as well as the NaCl and KCl introduced into the bath with the product discharged from the furnace remained in the bath without changing the composition of the latter. The same bath could be used again and again for receiving further batches of dehydrated carnallite-rock phosphate mixture.

*Example 11*

A mixture of $MgCl_2.6H_2O$ and NaCl was dehydrated in vacuo at 175° C. It then contained 12% of Mg 15.6% of Na and 59.5% of Cl. 100 g. of enriched Oron rock phosphate (containing 33.5% of $P_2O_5$ and 37% of Ca) was mixed with 250 g. of the dehydrated salt mixture aforesaid and this entire mixture was heated in a reaction tube in the manner described in Example 3. The heating was interrupted at 555° C. when the mixture had sintered but was not completely fused. The mixture was allowed to cool and leached with water. The residue was filtered and the filter cake was washed with water until free from chloride. The filtrate contained 81% of the calcium introduced by the rock phosphate, and 2.7 g. of Mg introduced in excess over the amount required for the production of magnesium phosphate. The dried residue had the following composition:

30.7% of total $P_2O_5$
14.4% of citrate-soluble $P_2O_5$
7% of Ca

*Example 12*

100 g. of Moroccan phosphate containing 32.2% of $P_2O_5$ and 49.6% of Ca was admixed with 180 g. of a dehydrated natural technical grade carnallite containing:

0.8% of Ca
9.7% of Mg
12.7% of K
10.7% of Na
57.4% of Cl
4.6% of $H_2O$

In this mixture the amount of magnesium chloride was about 80% of the amount stoichiometrically equivalent to the total amount of calcium present. The mixture was heated in a tubular reaction vessel to 500–550° C. when it began to sinter, and was kept in this temperature range for one minute. The condensation of evaporated water was prevented by the application of a vacuum to the reaction vessel.

After cooling, the product was washed with water until free of chloride. The dry product contained:

33.8% of $P_2O_5$
7.6% of Ca
27.6% of Mg

*Example 13*

100 g. of the same de-slimed Oron rock phosphate as used in Example 1 was mixed with 155 g. of natural carnallite containing:

0.3% of Ca
8.1% of Mg
12% of K
1.4% of Na
37.2% of Cl and
41% of $H_2O$ (by difference)

In this mixture the amount of $MgCl_2$ was approximately 50% of the amount stoichiometrically equivalent to the total amount of calcium present in the rock phosphate.

The mixture was heated to 520–550° C.; condensation of water evaporated during the heating-up period was prevented by the application of a vacuum.

After the solid mass had cooled it was leached with water and washed until free of chloride. The dry product contained:

31.5% of $P_2O_5$
17.9% of Ca
16.8% of Mg

What we claim is:

1. A process for the manufacture of anhydrous magnesium orthophosphate, which comprises reacting rock phosphate containing a predetermined amount of calcium with a mixture of anhydrous magnesium chloride and a chloride selected from the group consisting of alkali metal chlorides and ammonia chloride at a temperature sufficiently high to cause said mixture to start to melt, said mixture containing an amount of magnesium stoichiometrically equivalent to a desired proportion of the calcium of the rock phosphate, thereby to produce a product consisting of a mixture of a major part of anhydrous magnesium orthophosphate and a minor part of calcium orthophosphate.

2. A process for the manufacture of anhydrous magnesium orthophosphate, which comprises reacting rock phosphate containing a predetermined amount of calcium with a mixture of anhydrous magnesium chloride and a chloride selected from the group consisting of alkali metal chlorides and ammonium chloride at a temperature sufficiently high to cause said mixture to start to melt, said mixture containing an amount of magnesium stoichiometrically sufficient to replace substantially all of the calcium of the rock phosphate by said magnesium.

3. A process for the manufacture of anhydrous magnesium orthophosphate, which comprises reacting rock phosphate containing a predetermined amount of calcium with a mixture of anhydrous magnesium chloride and a chloride selected from the group consisting of alkali metal chlorides and ammonium chloride at a temperature of about 300–600° C., an amount of magnesium stoichiometrically equivalent to a desired proportion of the calcium of the rock phosphate, thereby to produce a product consisting of a mixture of a major part of anhydrous magnesium orthophosphate and a minor part of calcium orthophosphate.

4. A process for the manufacture of anhydrous magnesium orthophosphate, which comprises reacting rock phosphate containing a predetermined amount of calcium with a mixture of anhydrous magnesium chloride and a chloride selected from the group consisting of alkali metal chlorides and ammonium chloride at a temperature of about 300–600° C. said mixture containing an amount of magnesium stoichiometrically sufficient to replace substantially all of the calcium of the rock phosphate by said magnesium; and leaching the reaction product thereby obtained with water so as to remove chloride contained in the reaction product.

5. A process according to claim 1, wherein the amount of magnesium introduced in the form of anhydrous magnesium chloride into the reaction mixture is stoichiometrically in excess as compared to the total amount of calcium contained in the rock phosphate used as starting material, for the conversion of all the tertiary calcium phosphate of the rock phosphate into tertiary magnesium orthophosphate.

6. A process according to claim 1, wherein said mixture contains magnesium chloride and sodium chloride.

7. A process according to claim 1, wherein said mixture contains said magnesium chloride and said chloride selected from the group consisting of alkali metal and ammonium chlorides in the molecular ratio of substantially 1:1.

8. A process according to claim 1, wherein the rock phosphate is introduced into a bath containing melted magnesium chloride and alkali metal chloride.

9. A process according to claim 2, wherein the rock phosphate is introduced into a bath containing melted magnesium chloride and alkali metal chloride.

10. A process according to claim 1, wherein the rock phosphate is first admixed with magnesium chloride and a chloride selected from the group consisting of alkali metal and ammonium chlorides and the mixture is heated to a temperature sufficient to cause sintering.

11. A process according to claim 1, wherein a solid reaction mixture of rock phosphate, magnesium chloride and alkali metal chloride is dehydrated at moderate heat and then introduced into a bath of molten calcium chloride and alkali metal chloride and the precipitate of anhydrous tertiary magnesium phosphate thereby formed is separated from the bath.

12. A process according to claim 1, wherein the hot reaction mixture is quenched in water.

References Cited by the Examiner

UNITED STATES PATENTS 991,096    5/11    Schroder _____ 23—108

FOREIGN PATENTS 783,781    4/35    France.
447,393    7/27    Germany.
449,288    9/27    Germany.
7,059    4/84    Great Britain.

MAURICE A. BRINDISI, *Primary Examiner.*